(12) United States Patent
Inoue et al.

(10) Patent No.: US 6,950,268 B2
(45) Date of Patent: Sep. 27, 2005

(54) DISK DRIVE

(75) Inventors: Takahiro Inoue, Odawara (JP);
Kiyotada Itou, Odawara (JP);
Kazuhisa Shishida, Odawara (JP);
Shinji Matsushita, Odawara (JP);
Takao Horiguchi, Odawara (JP)

(73) Assignee: Hitachi Global Storage Technologies Japan, Ltd., Odawara (JP)

( * ) Notice: Subject to any disclaimer, the term of this patent is extended or adjusted under 35 U.S.C. 154(b) by 170 days.

(21) Appl. No.: 10/358,889

(22) Filed: Feb. 6, 2003

(65) Prior Publication Data

US 2003/0161066 A1 Aug. 28, 2003

(30) Foreign Application Priority Data

Feb. 27, 2002 (JP) ........................................ 2002-050675

(51) Int. Cl.⁷ .............................................. G11B 5/596
(52) U.S. Cl. .................................................. 360/77.07
(58) Field of Search .......................... 360/77.04, 77.05, 360/77.07, 77.02; 369/59.21; 318/608

(56) References Cited

U.S. PATENT DOCUMENTS

| | | | |
|---|---|---|---|
| 4,638,384 A | * | 1/1987 | Stewart et al. ............ 360/77.05 |
| 4,740,736 A | * | 4/1988 | Sidman et al. .............. 318/608 |
| 4,812,929 A | * | 3/1989 | Stewart et al. ............ 360/77.07 |
| 6,141,175 A | | 10/2000 | Nazarian et al. |
| 6,310,742 B1 | * | 10/2001 | Nazarian et al. ......... 360/77.04 |
| 6,437,936 B1 | | 8/2002 | Chen et al. |
| 6,529,460 B1 | * | 3/2003 | Belser ...................... 369/59.21 |
| 6,690,534 B2 | * | 2/2004 | Ding et al. .............. 360/77.02 |

FOREIGN PATENT DOCUMENTS

JP  A-2001-126421  5/2001

* cited by examiner

*Primary Examiner*—David Hudspeth
*Assistant Examiner*—Fred F. Tzeng
(74) *Attorney, Agent, or Firm*—Antonelli, Terry, Stout & Kraus, LLP

(57) ABSTRACT

In a disk drive, since high-frequency repeatable runout (RRO) components own low correlative relationships between adjoining tracks, a servo control system of a magnetic head is followed to the high-frequency RRO components, and thus, in the worst case, there is a possibility that data which have been previously recorded on these tracks are destroyed. To avoid this problem, both a tracking type repetitive control unit which is followed to low-frequency RRO components, and a rejection type repetitive control unit which cancels the high-frequency RRO components are provided in a following control loop in order that the following control system is not unnecessarily followed to the high-frequency RRO.

19 Claims, 14 Drawing Sheets

DISK DRIVE

BACKGROUND OF THE INVENTION

The present invention is related to a positioning control of a disk drive capable of performing a positioning control of a head to a target track in a high speed and high precision.

In magnetic disk drive corresponding to one of disk drive, magnetic heads are positioned onto data tracks formed on magnetic disks so as to read/write data from/in the data tracks.

A sector servo system may constitute a major servo system, in which a positioning control of a magnetic head is carried out based upon a servo pattern formed by intermittently recording servo signals on a plane where data are recorded. As a consequence, a controller calculates a control input for controlling the magnetic head in synchronism with an interrupt signal produced by a servo sector so as to execute the positioning control of the magnetic head.

A positioning control system for a magnetic disk drive may be mainly classified into a seek mode and a following mode. In the seek mode, the magnetic head is transported with respect to a target track in a high speed. In the following mode, the magnetic head is followed to a target servo track.

A track which should be followed by a magnetic head is continuously varied due to disk deviations, disk distortions, vibrations of a spindle motor during servo track writing operation, and the like. These factors may be effected as repeatable runout (RRO) in a positioning control system of a magnetic head. Then, these repeatable runout vibrations may cause one of factors which may deteriorate positioning precision of the magnetic head. As a consequence, such a positioning control technique capable of reducing these RRO is necessarily developed.

As one example of such a positioning control technique, JP-A-2001-126421 discloses such a repetitive control system. That is, while a position error signal which has been delayed for one rotation period during following control operation is entered into a filter, a correction instruction which is obtained by multiplying an output signal of the filter by a gain is added to a current position error signal which is not delayed so as to produce a new control output, and then, positional errors are compressed by being followed to RRO.

The technique disclosed in JP-A-2001-126421 may have a better compression effect with respect to low frequency RRO components. However, according to this technique, the compression rate with respect to high-frequency RRO components is lowered due to a low-pass filter installed in a repetitive control unit. In this case, when the cutoff frequency of the low-pass filter is set to be a higher cutoff frequency, there is a risk that the stability of the following control system is deteriorated. Therefore, it is practically difficult to compress the RRO over the entire frequency range.

SUMMARY OF THE INVENTION

Generally speaking, low frequency components own correlative relationships between adjoining tracks. As a consequence, even when a positioning control is followed to low frequency components of servo tracks, relative distances between adjoining tracks become substantially constant. If the relative distances are constant, then there is a very small possibility that data of adjoining tracks are over-written and are thus destroyed. However, RRO components having high frequencies such as discontinued portions of servo patterns (write-starting portions and write-end portions of servo patterns) own small correlative relationships between adjoining tracks. In the repetitive control system as disclosed in JP-A-2001-126421, the position control is also followed to the high frequency components. As a result, distances between adjoining tracks are made narrow. In the worst case, there is such a possibility that the previously recorded data are destroyed.

Furthermore, in the repetitive control system described in JP-A-2001-126421, the control output for compressing the RRO is produced by employing the position error signal obtained one rotation before of the magnetic disk. As a result, since the repetitive control operation is carried out, the effect of the repetitive control unit cannot appear while the magnetic disk is rotated by one turn.

In accordance with the present invention, a compression rate with respect to RRO may be improved without destroying data of adjoining tracks, and performance may not be degraded even in such a case that the RRO are large, so that positioning control of a head may be carried out at high speed and in high precision.

Also, according to the present invention, such a control output capable of compressing a repeatable runout signal may be produced without requiring a delay time for one rotation of the disk.

Concretely speaking, both a tracking type repetitive control unit which is followed to a low-order RRO component, and a rejection type repetitive control unit which does not respond to a high-order RRO component are employed in a following control loop. Since such an arrangement is employed, it is possible to avoid data destruction of adjoining tracks, which is caused by that the following control loop is unnecessarily followed to high-frequency RRO. Also, the high-order RRO components can be canceled by the rejection type repetitive control unit. The positioning control of the magnetic head can be carried out in high precision because of these effects.

Also, in order not to deteriorate performance of the disk drive when RRO such as disk deviation components are increased, such a band-pass filter is combined with both the tracking type repetitive control unit and the rejection type repetitive control unit in the following control system. This band-pass filter owns a gain peak at a frequency equal to a rotation period. With employment of such an arrangement, after the present control system is switched to the following control system, the band-pass filter may be operated so as to compress the disk deviations. Then, since the transition characteristic during the settling operation is improved, the positioning control of the head can be carried out at high speed and in high precision.

Other objects, features and advantages of the invention will become apparent from the following description of the embodiments of the invention taken in conjunction with the accompanying drawings.

DESCRIPTION OF THE EMBODIMENTS

Referring now to drawings, a description will be made of such an embodiment that a disk drive of the present invention has been applied to a magnetic disk drive. It should be understood that the present invention is not limited to the magnetic disk drive, but may be applied to a recording/reproducing apparatus such as an optical disk drive and a magneto-optical disk drive, which utilizes a rotary type medium.

Figure 2:
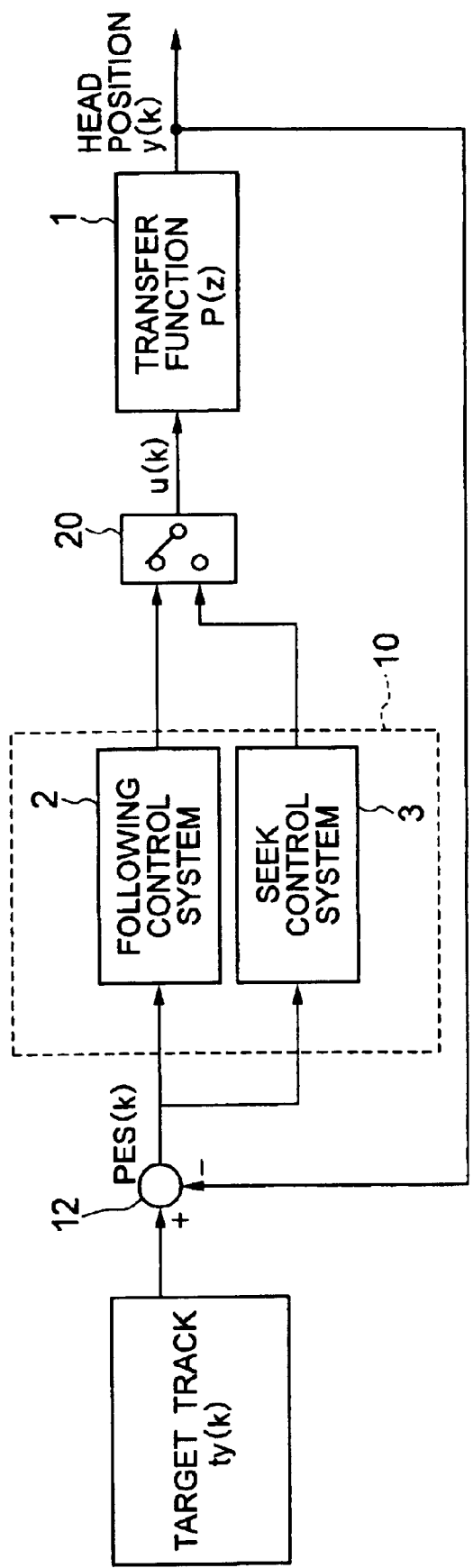
FIG. 2 is a schematic block diagram for indicating a servo control system.

FIG. 2 shows a schematic block diagram of a positioning control system of a magnetic disk drive, which indicates an embodiment of the present invention. In FIG. 2, a transfer function P(z) 1 represents a model for VCM (Voice Coil Motor) actuator of the magnetic disk drive. The VCM actuator is arranged by a power amplifier, VCM, a head supporting mechanism, a position signal demodulating system, and the like. The control system indicated in FIG. 2 and so on is controlled by a servo microcomputer. Generally speaking, software such as a computer program is employed as a control manner. Alternatively, the control system may be mechanically controlled by way of hardware instead of the software.

Figure 15:
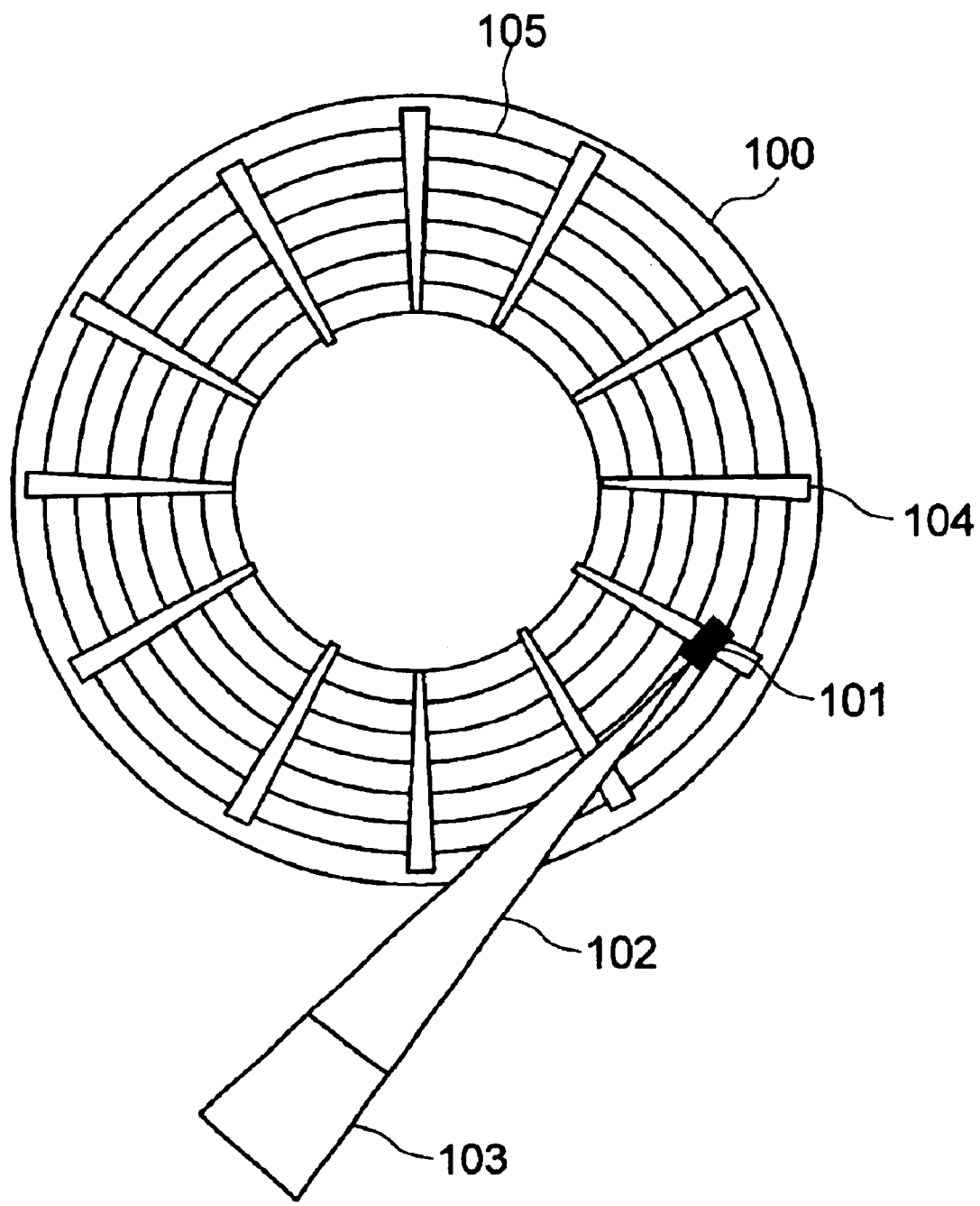
FIG. 15 is a conceptional diagram for illustratively showing a magnetic disk and a magnetic head.

As indicated in FIG. 15, in the magnetic disk drive, a magnetic disk 100 corresponding to a recording medium is mounted on a spindle motor (not shown). As to the magnetic disk 100, a large number of coaxial-shaped tracks 105 are formed on a surface of a recording medium. The respective tracks 105 are segmented into a plurality of sectors. In each of these sectors, a servo area 104 on which servo information has been recorded is arranged.

A magnetic head 101 is supported by a distal end of an arm 102. An actuator 103 positions the magnetic head 101 to such a tack which constitutes a target (will be referred to as a "target track" hereinafter) on the magnetic disk 100 by transporting the arm 102.

In this embodiment, positioning control system includes both a seek control system and a mode switching type control system. The seek control system moves the magnetic head 101 to a position in the vicinity of the target track by a speed control system, and the mode switching type control system switches from the seek control system to a following control system corresponding to a position control system in the vicinity of the target track when the magnetic head 101 moves to this target track. A total interrupt number of servo sectors is defined as "k" in the below-mentioned explanation.

A servo control unit 10 shown in FIG. 2 produces an operation amount for driving the actuator 103 based upon a position error signal PES(k). The servo control system 10 is constituted by a seek control system 3 employed in the seek control operation, and also, a following control system 2 employed in a following control operation.

A subtracter 12 which is employed as a position error signal detector calculates the position error signal PES(k) from deviations between a target track ty(k) and a magnetic head position y(k).

The seek control system 3 firstly produces a magnetic head speed "v(k)" by employing an input "u(k)" to the VCM actuator transfer function "P(z)1" and the position error signal "PES(k)." Next, the seek control system 3 calculates a target speed "tv(k)" based upon a magnetic head position "y(k)" and a target track "ty(k)." Then, the seek control system 3 acquires a deviation between this target speed tv(k) and the magnetic head speed v(k) which has been previously produced. Furthermore, the seek control system 3 calculates an operation amount which is directly proportional to this deviation. Then, the seek control system 3 adds this calculated control output to an acceleration feed-forward amount which is obtained from the target speed tv(k). An addition result is applied to the controlling target P(z)1 as a control input when the seek control operation is carried out.

When the deviation PES(k) between the magnetic head position y(k) and the target track ty(k) becomes smaller than a previously determined value "$r_0$" (namely, (PES(k)<$r_0$), a switch 20 switches a signal to be selected from the seek control system 3 to the following control system 2. In this case, a controller such as a phase lead-lag compensator is employed as a following filter 11 employed in the following control system 2.

Figure 1:
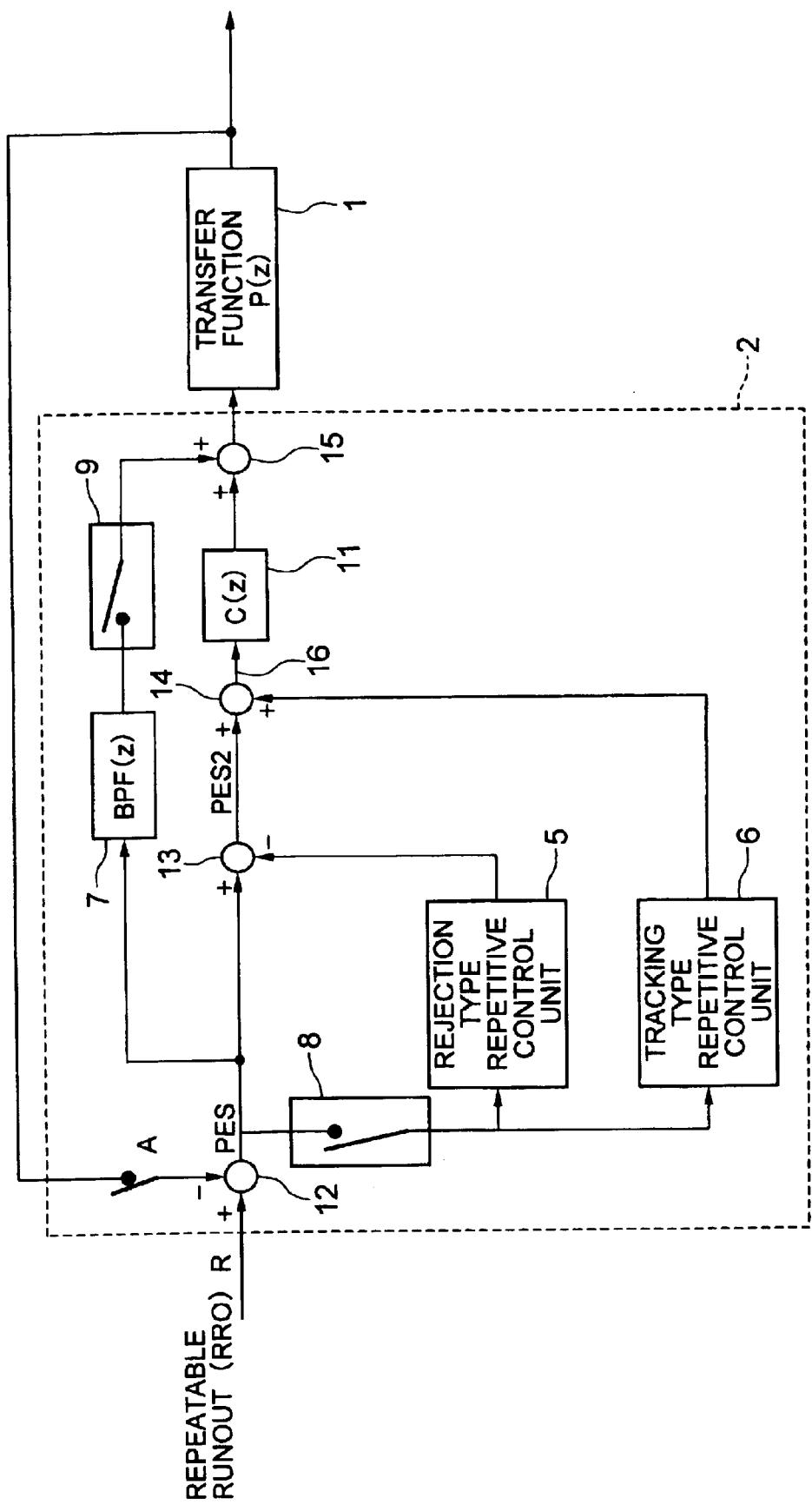
FIG. 1 is a schematic block diagram of a following control system according to a first embodiment mode of the present invention.

As indicated in FIG. 1, the following control system 2 is constituted by a following filter 11, a runout compensator 7, a tracking type repetitive control unit 6, a rejection type repetitive control unit 5, switches 8 and 9, a subtracter 13, and an adder 15.

Figure 3:
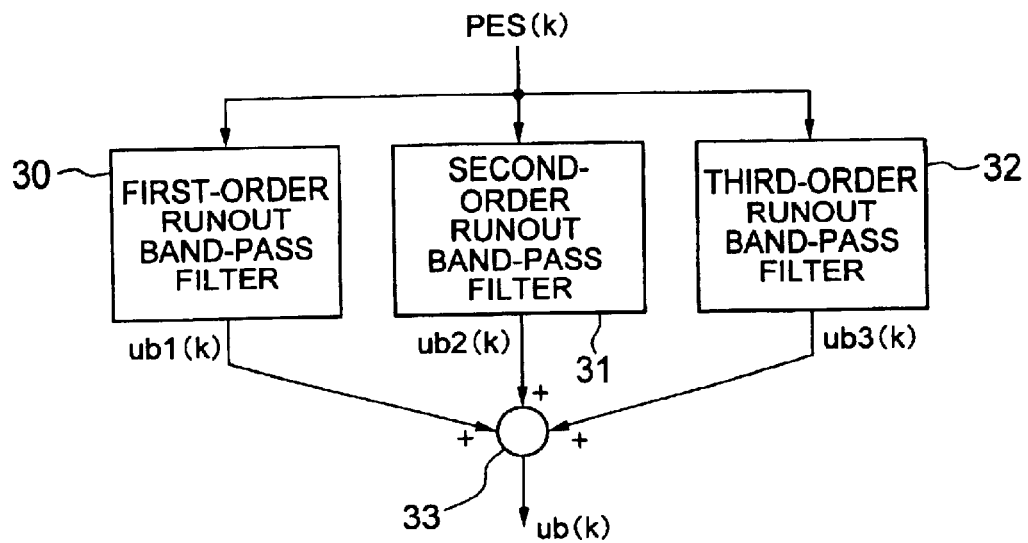
FIG. 3 is an arrangement of a runout compensator.

The runout compensator 7 corresponds to such a compensator capable of compressing vibration components which are synchronized with rotations of the spindle motor (not shown). Then, the runout compensator 7 corresponds to a filter having such a characteristic that a gain peak is obtained at a frequency of integer harmonics of the disk rotation. Both the tracking type repetitive control unit 6 and the rejection type repetitive control unit 5, which will be explained later, employ a position error signal PES(k) acquired one spindle rotation before. As a consequence, the compression effect with respect to RRO may appear after the delay of one spindle revolution since the operation has been commenced. Under such a circumstance, in order to improve a transient response when the seek control is carried out, the runout compensator 7 is employed. FIG. 3 indicates an arrangement of the runout compensator 7 in this embodiment.

The runout compensator 7 indicated in FIG. 3 is arranged as follows: A first-order runout band-pass filter 30, a second-order runout band-pass filter 31, and further, a third-order runout band-pass filter 32 are connected in parallel to each other. The first-order runout band-pass filter 30 compresses disturbance (eccentricity) which is synchronized with the rotational frequency of the spindle motor. The second-order runout band-pass filter 31 compresses the second harmonic componenet of RRO. The third-order runout band-pass filter 32 compresses the third harmonic component of RRO.

The first-order runout band-pass filter 30 outputs such a signal "ub1(k)" that a frequency component (70 Hz frequency component in this embodiment mode) corresponding to a rotational frequency of the disk in position error signal PES(k) has been amplified. Similarly, the second-order runout band-pass filter 31 outputs such a signal "ub2(k)" that a frequency component (140 Hz frequency component in this embodiment mode) corresponding to a frequency two times higher than the rotational frequency of the inputted position error signal PES(k) has been amplified. Also, the third-order runout band-pass filter 32 outputs such a signal "ub3(k)" that a frequency component (210 Hz frequency component in this embodiment) corresponding to a frequency three times higher than the rotational frequency of the inputted position error signal PES(k) has been amplified. Then, the adder 33 adds these signals ub1(k), ub2(k), ub3(k) to each other, and then, outputs a signal "ub(k)."

The switch 9 is turned ON/OFF in such a manner that this switch 9 outputs the signal ub(k) derived from the runout compensator 7 in such a case that when the serve mode is in the following control mode, the position error signal PES(k) is smaller than a predetermined value "$r_1$" (note that $r_0 > r_1$), namely the position error signal being PES(k)<$r_1$. The adder 15 adds the signal ub(k) outputted when this condition is satisfied to the output of the following filter 11, and then, adds the resultant signal to the VCM actuator transfer function P(z)1.

After the switch 9 has been turned ON, a counter (not shown) counts a total number of servo sector interrupt. When this count value of the counter becomes larger than, or equal to a predetermined value, the switch 8 is brought into the ON state, and thus, inputs the position error signal "PES" to both the tracking type repetitive control unit 5 and the rejection type repetitive control unit 6.

Figure 4:
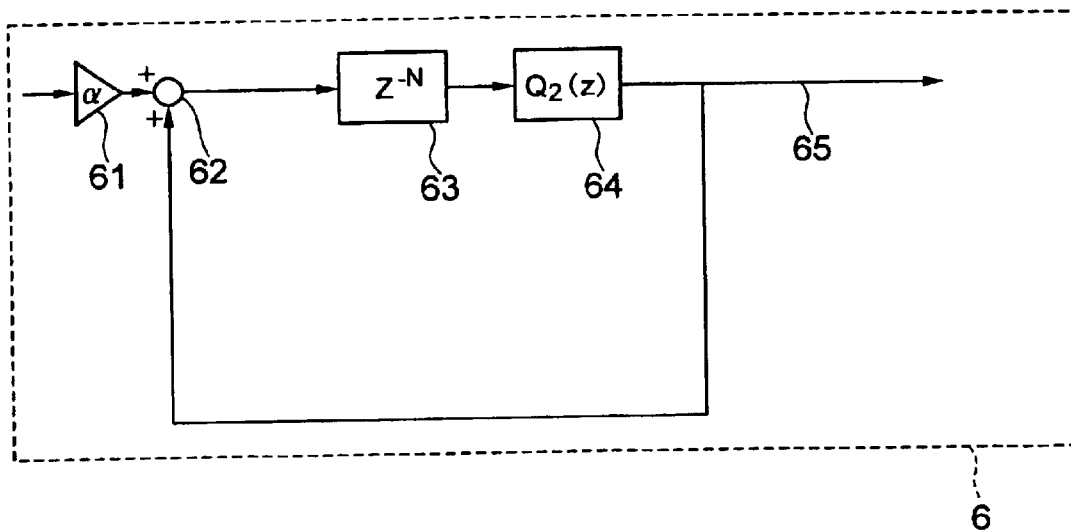
FIG. 4 is a schematic block diagram of a tracking type repetitive control unit.

As indicated in FIG. 4, the tracking type repetitive control unit 6 is arranged by a delay operator 63, an adder 62, a multiplier 61, and a low-pass filter 64.

The multiplier 61 multiplies the position error signal PES entered into the tracking type repetitive control unit 6 by a constant "α." In this embodiment, the constant "α" is equal to 0.2. Then, the adder 62 adds an output of the multiplexer 61 to an output of the low-pass filter 64 so as to produce an output signal 65.

The delay operator 63 sequentially stores thereinto signals outputted from the adder 62. Then, the delay operator 63 delays this signal for N samples, and thereafter outputs this delayed signal to the low-pass filter 64. In this case, symbol "$Z^{-1}$" denotes an operator for delaying a signal by 1 servo sample. Also, symbol "N" indicates a sample number per one rotation of a magnetic disk, namely, a servo sector number. In this embodiment, this sample number "N" is equal to 108. Such an operation that a signal is delayed for N samples and then the delayed signal is outputted to the low-pass filter 64 is equivalent to such an operation that a signal produced at the same servo sector one disk revolution before is outputted to the low-pass filter 64.

The delay operator 63 is operated in such a way that a servo sector number and a signal at this time are stored in a memory in correspondence with each other. Then, after the delay of one disk revolution, the delay operator 63 outputs a storage value of the memory, which corresponds to this servo sector number. As a result in this embodiment, since the total number of servo sector "N" is equal to 108, the delay operator 63 is equipped with 108 pieces of memories.

An output 65 of the low-pass filter 64 is an output from the tracking type repetitive control unit 6. The adder 14 adds this output 65 to a modified position error signal "PES2."

The low-pass filter 64 corresponds to a zero-phase type (no phase delay is present within all frequency range) FIR (finite impulse response) filter which is defined by a transfer function.

[Expression 1]

$$Q_1(z, z^{-1}) = \frac{a_m Z^m + a_{m-1} Z^{m-1} + \cdots a_0 + a_1 Z^{-1} + \cdots + a_m Z^{-m}}{2a_m + 2a_{m-1} + \cdots + 2a_1 + a_0} \quad (1)$$

In this embodiment, the low-pass filter 64 has been selected as a third-order FIR filter indicated in (expression 2):

[Expression 2]

$$Q_1(z, z^{-1}) = \frac{Z + 2 + Z^{-1}}{4} \quad (2)$$

Figure 5A:
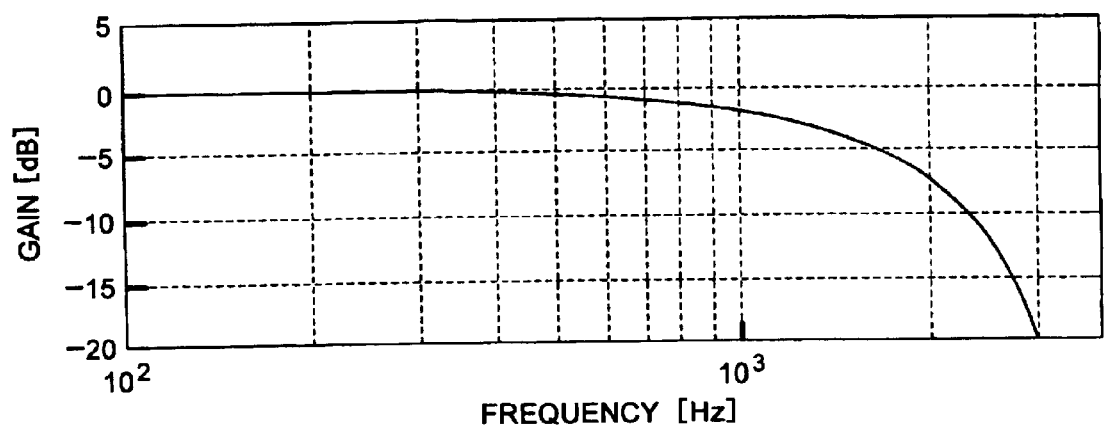
FIG. 5A and FIG. 5B show Bode diagrams of a low-pass filter.
Figure 5B:
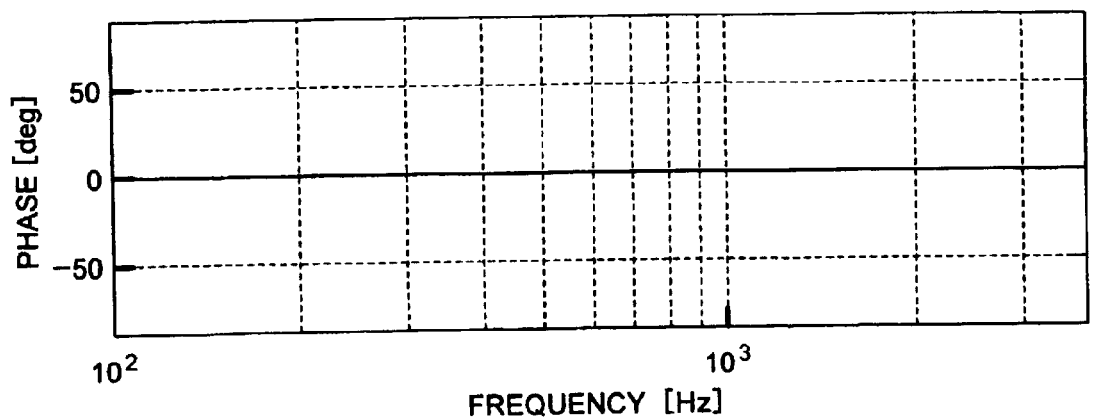

FIG. 5A and FIG. 5B represent frequency characteristics of the low-pass filter 64 at this time. As represented in this drawing, a phase delay does not appear over an entire frequency region (phase=0 degree).

Figure 6:
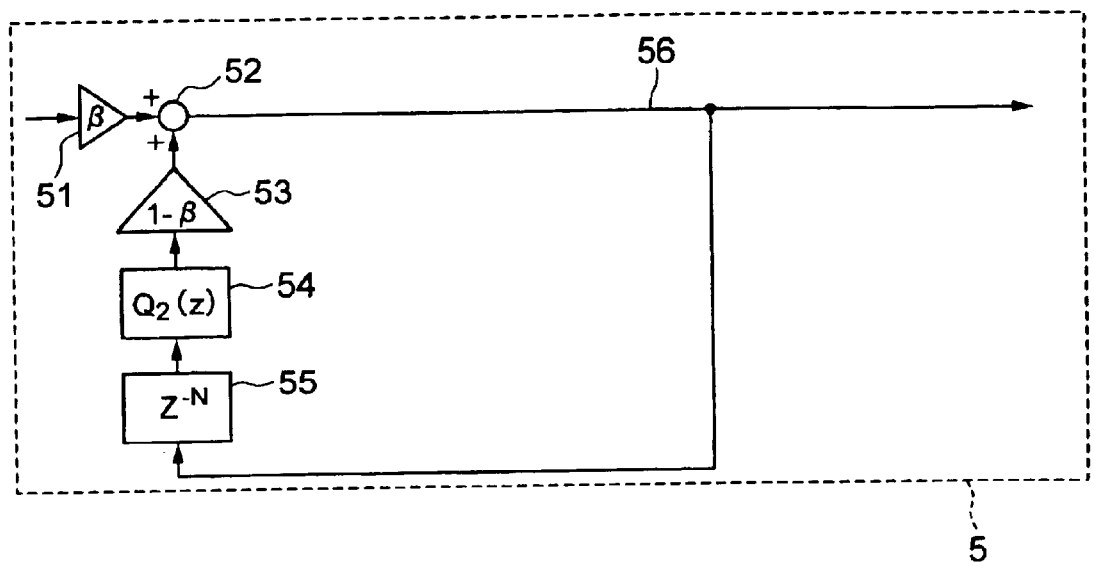
FIG. 6 is a schematic diagram of a settling runout compensator.

Next, the rejection type repetitive control unit 5 will now be explained with reference to FIG. 6. The rejection type repetitive control unit 5 is constituted by multipliers 51 and 53, an adder 52, a high-pass filter 54, and a delay operator 55.

The multiplier 51 multiplies the position error signal PES inputted to the rejection type repetitive control unit 5 by a constant "β." In this embodiment, this constant "β" is equal to 0.2. The adder 52 adds an output signal of the multiplier 51 to an output signal of the multiplier 53 so as to produce an output signal 56 of the rejection type repetitive control unit 5.

The delay operator 55 sequentially stores thereinto the output signals 56. Then, the delay operator 55 delays the output signal 56 for N samples, and thereafter, outputs the delayed output signal 56 to the high-pass filter 54. The multiplier 53 multiplies an output signal from the high-pass filter 54 by another constant (1−β) to output the multiplied output signal to the adder 52.

Similar to the delay operator 63 of the tracking type repetitive control unit 6, in the delay operator 55 of the rejection type repetitive control unit 5, the output signal 56 is stored in a memory in correspondence with a servo sector number. Then, the delay storage element 55 corresponds to such an operator which outputs a memory value corresponding to the current servo sector number after delay of one rotation of the magnetic disk. As a consequence, this delay operator 55 may be realized by a plurality of memories whose quantity is equal to a total number of the servo sectors.

The high-pass filter 54 corresponds to a zero phase type FIR filter which is represented by such a transfer function similar to the expression (1). In this embodiment, as the high-pass filter 54, a ninth-order FIR filter indicated in expression (3) has been selected:

[Expression 3]

$$Q_2(z, z^{-1}) = -8.0e^{-3}Z^4 - 4.0e^{-2}Z^3 - 1.0e^{-1}Z^2 - 1.7e^{-1}Z + \\ 8.0e^{-1} - 1.7e^{-1}Z^{-1} - 1.0e^{-1}Z^{-2} - 4.0e^{-2}Z^{-3} - 8.0e^{-3}Z^{-4} \quad (3)$$

Figure 7A:
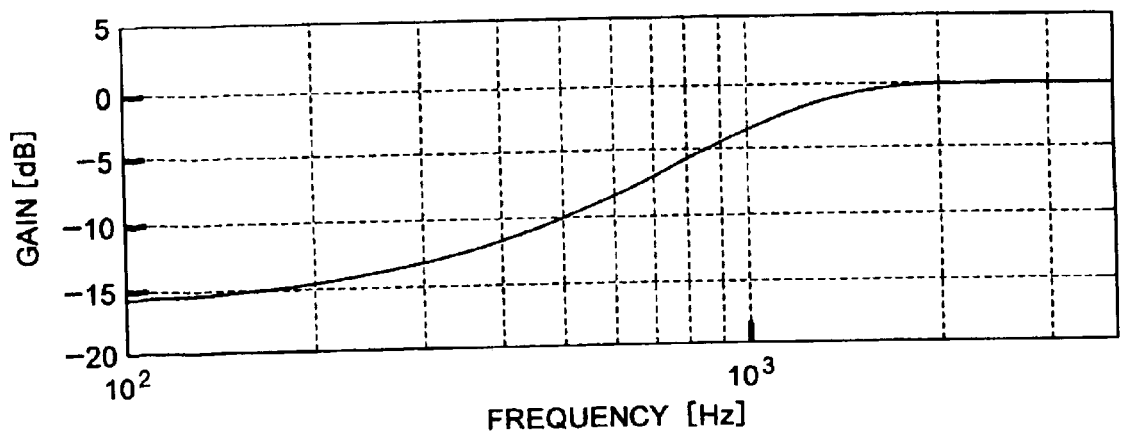
FIG. 7A and FIG. 7B represent Bode diagrams of a high-pass filter.
Figure 7B:
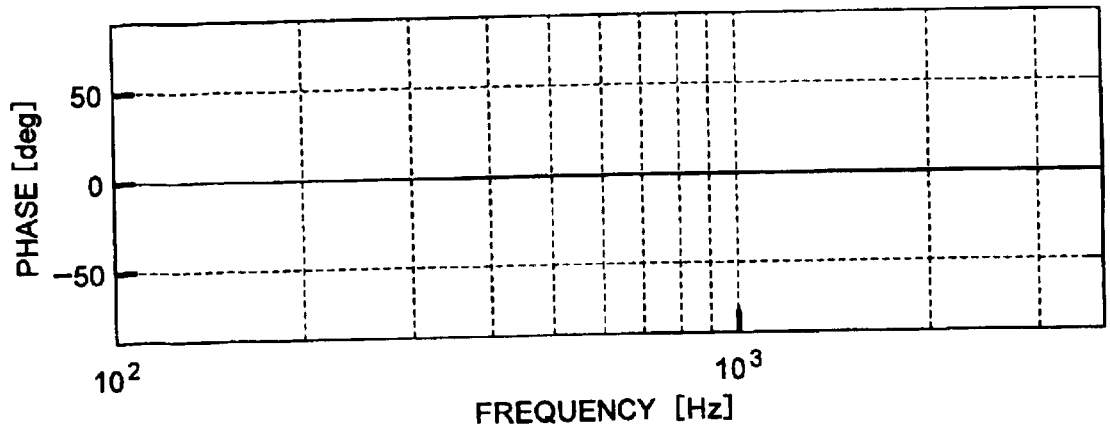

A frequency characteristic of the high-pass filter 54 according to this embodiment is represented in FIG. 7A and FIG. 7B. In the graphic diagram (gain characteristic) of FIG. 7A in which an ordinate thereof indicates the gain, the gain is set to zero decibel [dB] in such a case that the frequency is higher than approximately $2\times10^3$. In the case that the frequency is lower than approximately $2\times10^3$, the gain is gradually decreased. Also, in such a case that the phase is plus, it indicates that the phase is led, whereas in the case that the phase is minus, it indicates that the phase is delayed. As a consequence, a graphic diagram (phase characteristic) of FIG. 7B in which an ordinate thereof shows the phase indicates that there is no phase delay over the entire frequency range (phase=0 degree).

The subtracter 13 subtracts the output signal 56 of the rejection type repetitive control unit 5 from the position error signal PES so as to produce a modified position error signal "PES2."

The following filter 11 produces such a signal capable of driving the magnetic head 101 from the entered filter input value 16.

In this case, in the following control system, a transfer function $C_{REP}(Z)$ defined from a repeatable runout vibration "R" up to the filter input value 16 is expressed by the following expression (4):

[Expression 4]

$$C_{REP}(Z) = \frac{(1 - Q_2(z, z^{-1})z^{-N})((1-\beta) - (1-\beta-\alpha))}{(1 - Q_1(z, z^{-1})z^{-N})(1 - (1-\beta)Q_2(z, z^{-1})z^{-N})} \quad (4)$$

Figure 8A:
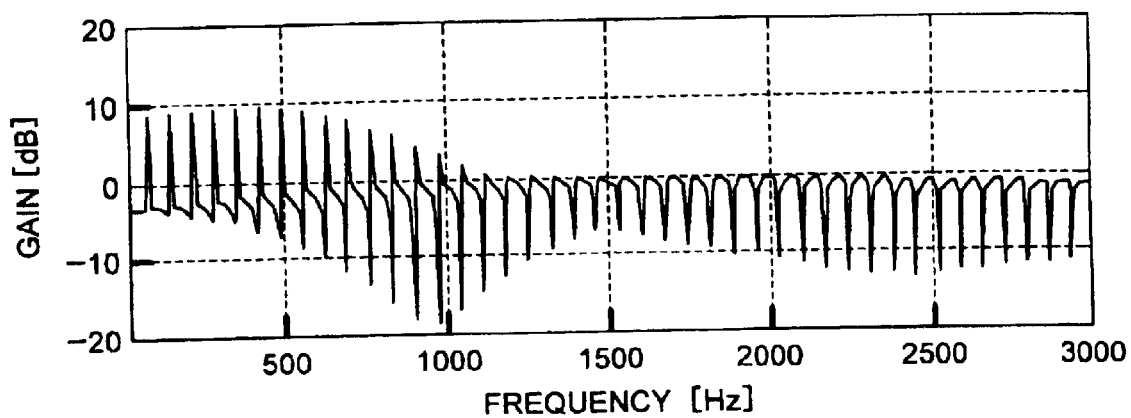
FIG. 8A and FIG. 8B indicate Bode diagrams of transfer functions from rotation period disturbance to an input of a following filter.
Figure 8B:
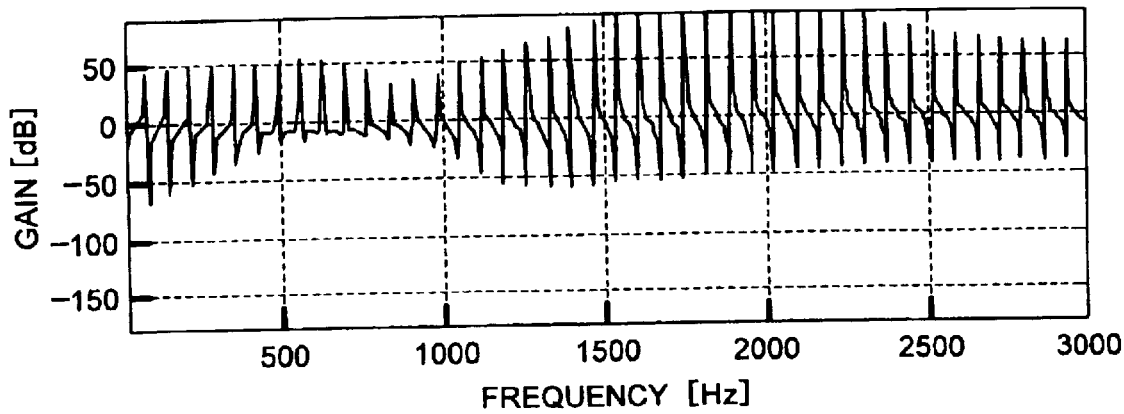

FIG. 8a and FIG. 8B show frequency characteristics (gain characteristics) of this transfer function $C_{REP}(Z)$. In this embodiment, the rotational frequency of the magnetic disk 100 is 70 Hz.

FIG. 8A graphically indicates a frequency characteristic (gain characteristic) in which an ordinate thereof denotes a gain. FIG. 8B graphically shows a frequency characteristic (phase characteristic) in which an ordinate thereof represents a phase. As can be understood from FIG. 8A, in frequencies up to approximately 1 KHz, the gains own peak characteristics (namely, such characteristics that gains are rapidly increased) at the frequencies of integer harmonics of the disk rotational frequency (namely, 70 Hz, 140 Hz, 210 Hz, - - - ). Also, at frequencies higher than, or equal to 1 KHz, a notch characteristic (namely, such a characteristic that gains are rapidly decreased) at the frequencies of the integer harmonics of the disk rotational frequency.

Generally speaking, in a servo control system, the larger a gain peak value is increased, the higher the disturbance compression effect achieves. In other words, in the servo system of this embodiment mode, in the low frequency range lower than, or equal to 1 KHz, since the RRO component contained in the position error signal is emphasized by the peak characteristic, such a control output is produced which responds to the RRO (namely, RRO is compressed). On the other hand, in the high frequency range higher than, or equal to 1 KHz, since the RRO component is rejected by the notch characteristic, such a control output is produced which does not respond to the harmonics of the RRO (namely, RRO is neglected).

In other words, since the following control system 2 has both the tracking type repetitive control unit 6 and the rejection type repetitive control unit 5, positioning of the magnetic head 101 can be carried out while the magnetic heads respond and follow to the low-order harmonics of the RRO, but neither responds, nor follows to the high-order harmonics of RRO. As a result, data destruction occurred on adjoining tracks can be prevented which is caused by that the magnetic heads are followed to the high-frequency RRO at excessively high degrees.

In accordance with the present embodiment, since the filter characteristic of the low-pass filter employed in the tracking type repetitive control unit 6 and the filter characteristic of the high-pass filter employed in the rejection type repetitive control unit 5 are changed, the frequency range of the RRO which should be followed, or not followed may be set. In other words, in such a case that the magnetic heads may be followed to RRO having higher frequencies, a cutoff frequency of the low-pass filter may be set to a higher frequency value. In such a case that the magnetic heads are desirably followed only to the low-frequency RRO, the cutoff frequency of the low-pass filter may be set to a low frequency value.

Figure 9A:
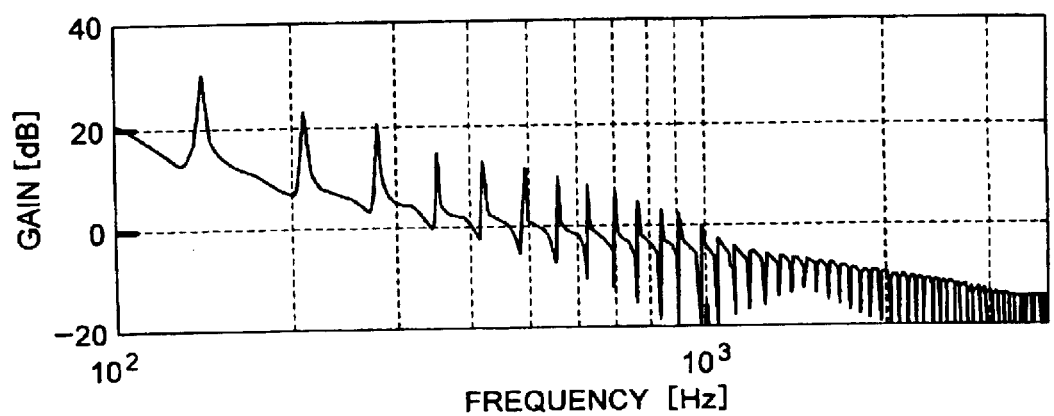
FIG. 9A and FIG. 9B indicate Bode diagrams of an open loop of a following control system.
Figure 9B:
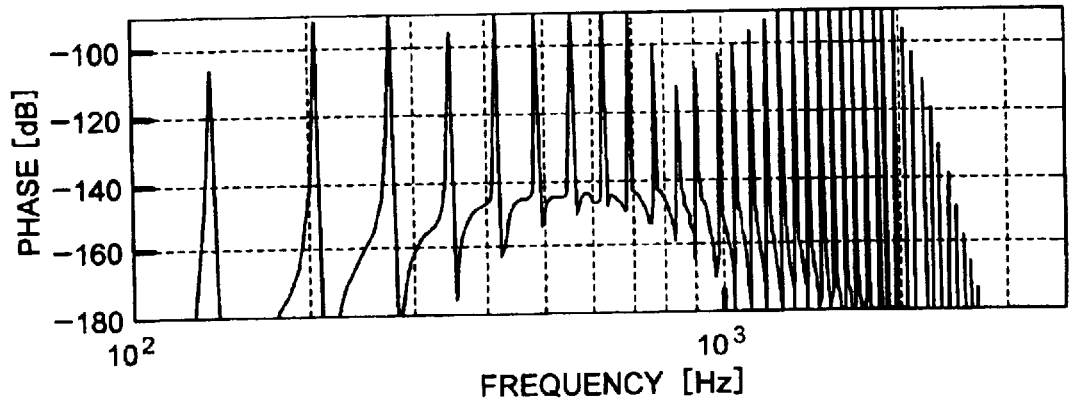

FIG. 9a and FIG. 9B show Bode diagrams (namely, gain characteristic and phase characteristic) of open loops when the loop is cut at a point "A" in the following control system 2 indicated in FIG. 1.

When an attention is paid to a gain characteristic, the gain characteristic of the following control system of this embodiment mode owns a peak characteristic at frequencies defined by the integer harmonics of the disk rotational frequency within the frequency range lower than, or equal to approximately 1 KHz, and also owns a notch characteristic at frequencies defined by harmonics of the disk rotational frequency within the frequency range higher than, or equal to approximately 1 KHz.

In general, the low-order harmonics of the RRO have high correlative relationships between adjoining tracks, the low-order harmonics of the RRO may be followed to repeatable runout components. Also, since high-order harmonics of the RRO own low correlative relationships between adjoining tracks, the high-order harmonics of the RRO may not be followed to repeatable runout components. As a consequence, in this embodiment, the cutoff frequency of the low-pass filter is set to be lower than the cutoff frequency of the high-pass filter. As a result, as represented in the Bode diagram (gain characteristic) of FIG. 9A, a gain peak frequency is set to be lower than a gain notch frequency.

Figure 10:
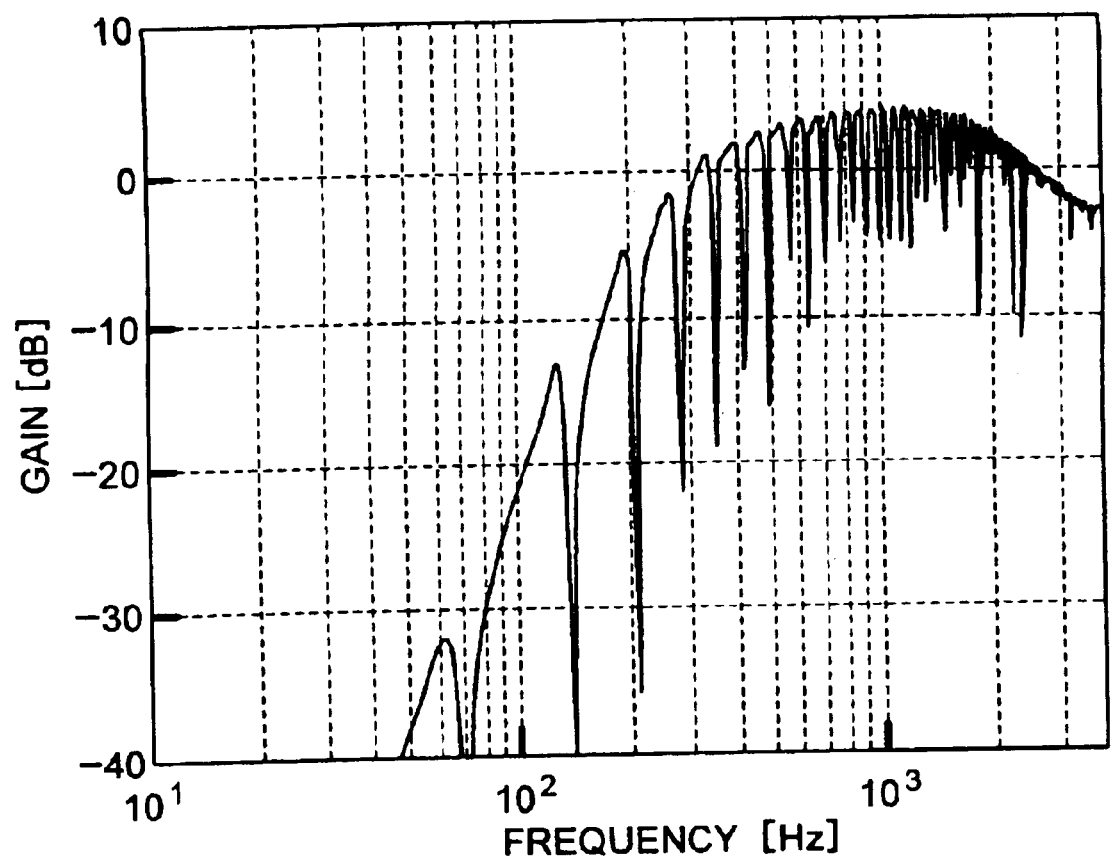
FIG. 10 graphically shows a gain characteristic of a sensitivity function of the following control system.

FIG. 10 indicates a closed-loop characteristic (sensitivity function) from the RRO R (periodic disturbance) to the modified position error signal PES2 in the following control system of FIG. 1. From this closed-loop characteristic, it can be seen that the gain owns the notch characteristic at the frequencies of the integer harmonics of the disk rotational frequency (namely, 70 Hz, 140 Hz, 210 Hz, - - - ). As a consequence, since such a servo system as shown in FIG. 1 is arranged, the disturbance response from RRO "R" to the modified position error signal PES 2 can be reduced.

Figure 11A:
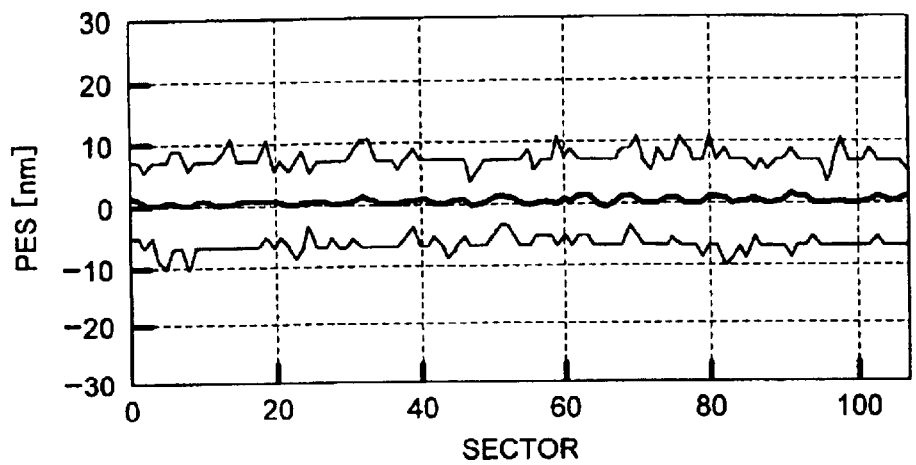
FIG. 11A and FIG. 11B graphically represent time waveform/RRO spectra of modified position error signals obtained according to the embodiment mode.
Figure 11B:
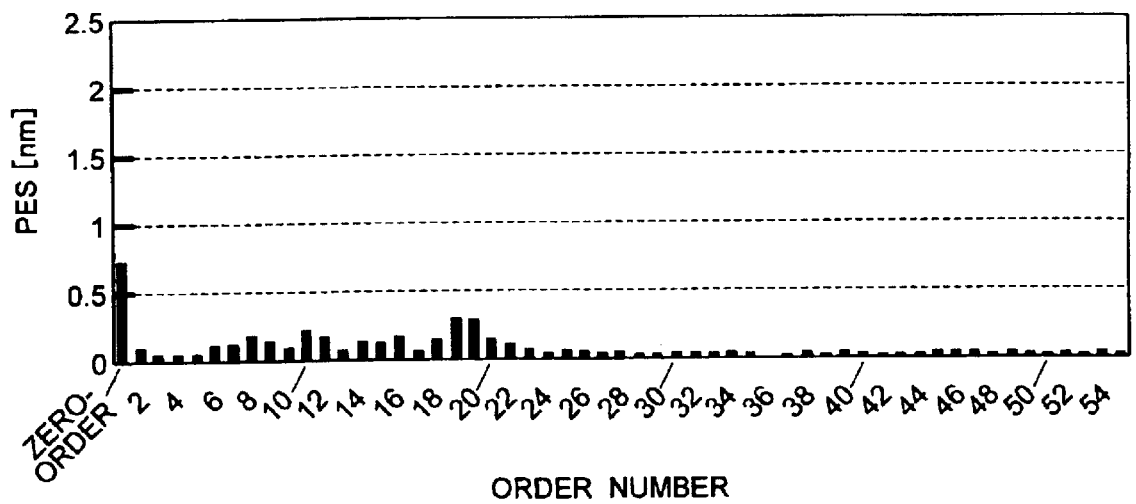
Figure 12A:
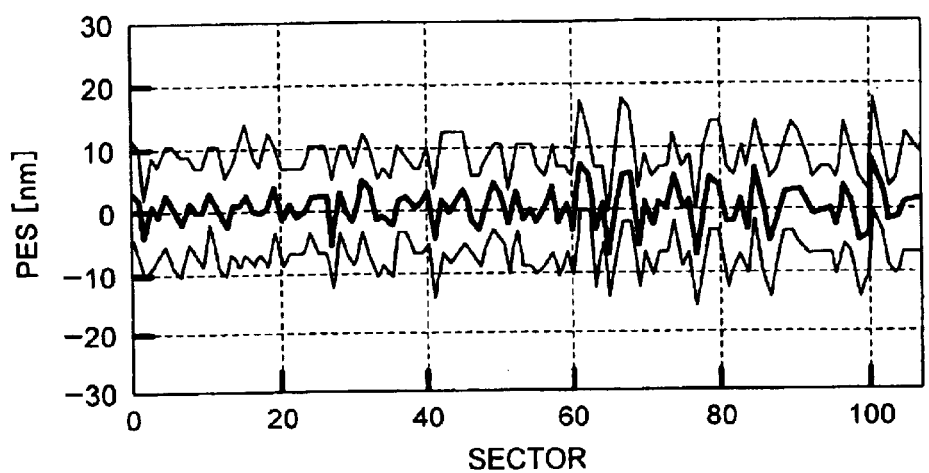
FIG. 12A and FIG. 12B graphically show time waveform/RRO spectra of position error signals obtained according to the general-purpose technique.
Figure 12B:
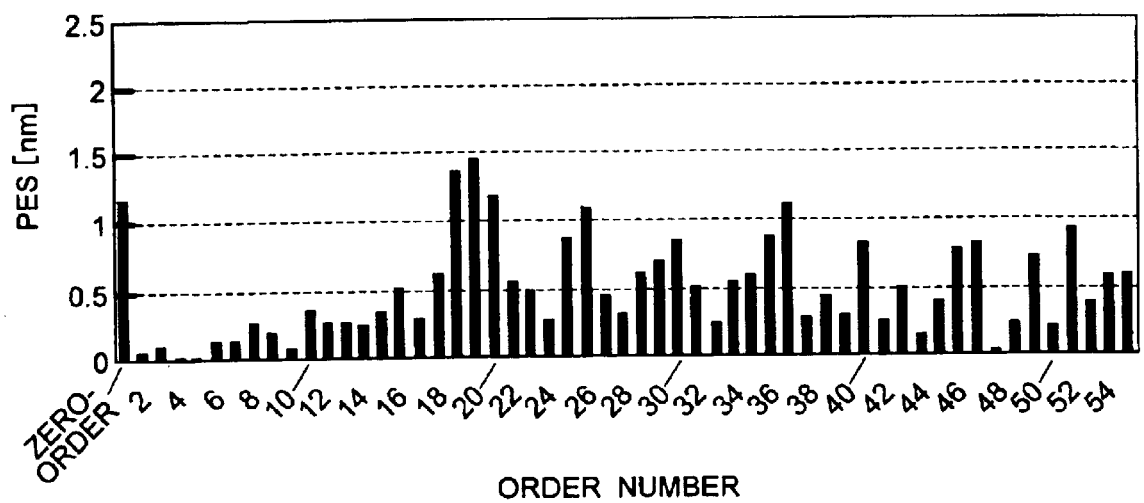
Figure 13A:
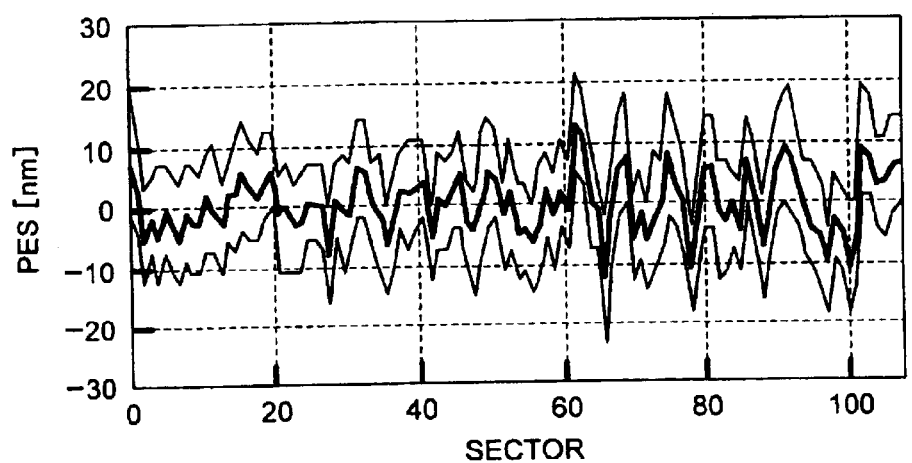
FIG. 13A and FIG. 13B graphically indicate time waveform/RRO spectra of position error signals in the case that a repetitive control is not employed.
Figure 13B:
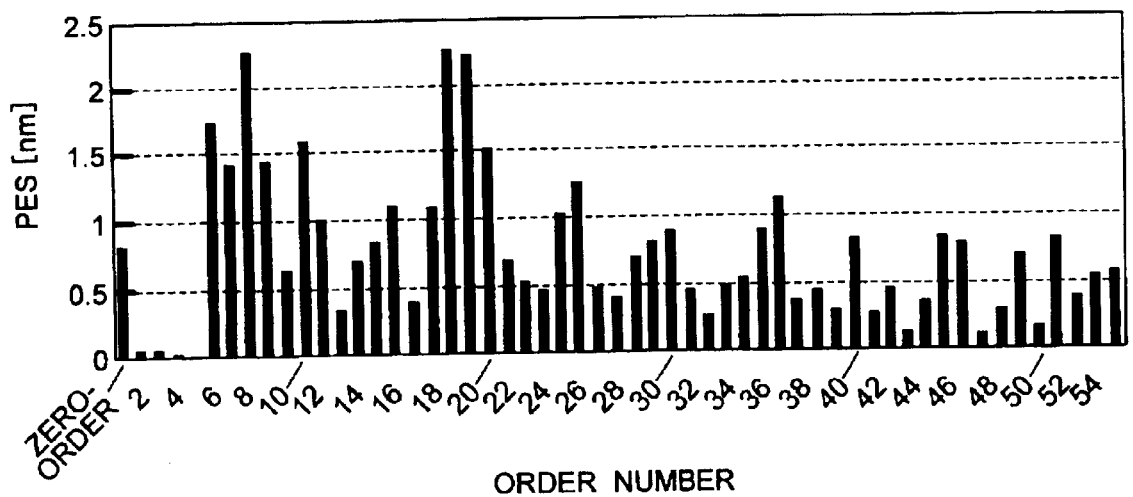

FIG. 11A and FIG. 11B represent a time waveform (wide line indicates average value (RRO), and narrow line shows envelope) of a modified position error signal, and a spectrum waveform of the average value. FIG. 12A and FIG. 12B indicate a time waveform of a position error signal, and an RRO spectrum in the case that only the tracking type repetitive control is employed similar to the conventional technique. FIG. 13A and FIG. 13B show a time waveform of a position error signal, and an RRO spectrum in the case that neither the tracking type repetitive control is employed. FIG. 11A and FIG. 11B show the time waveform (FIG. 11A) and the spectrum waveform (FIG. 11B) of the RRO in such a case that the tracking control is carried out with respect to all of the factors including the RRO component in the frequency range lower than, or equal to 1 KHz, and also the tracking control is not carried out as to the repeatable runout component in the frequency range higher than, or equal to 1 KHz. FIG. 12A and FIG. 12B indicate the time waveform (FIG. 12A) and the spectrum waveform (FIG. 12B) of the RRO in the case that the tracking control is carried out (namely, arrangement equipped with runout compensator 7 and tracking type repetitive control unit 6) with respect to all of the factors in all of the frequency ranges. FIG. 13A and FIG. 13B represent the time waveform (FIG. 13A) and the spectrum waveform (FIG. 13B) of the RRO in the case that the tracking control is not completely carried out in all of the frequency ranges (namely, arrangement equipped with only runout by both repetitive control compensator 7).

First, the time waveforms shown in the respective drawings will now be compared with each other. In FIG. 11A and FIG. 11B, the average value (RRO) indicates a value approximated to 0 nm, whereas a substantially large amount of errors are left even in the average value in FIG. 12A and FIG. 12B. In FIG. 13A and FIG. 13B, larger errors than those of FIG. 12A and FIG. 12B are left in the average value. Next, the result (shown in FIG. 12A and FIG. 12B) obtained by the conventional technique is compared with the result obtained by the present invention especially as to the 7th-order (490 Hz) frequency component and 18th-order (1260 Hz) frequency component in which the large position errors are left in such a case that the repetitive control is not carried out (indicated in FIG. 13A and FIG. 13B) with employment of the spectrum waveform of the average value RRO. With respect to the 7th-order frequency component which does not exceed 1 KHz, the positioning errors could be improved by approximately 0.3 nm in FIG. 12A and FIG. 12B, and also in FIG. 11A and FIG. 11B. However, with respect to the 18th-order frequency component which exceeds 1 KHz, the positional error of approximately 1.4 nm is left in FIG. 12A and FIG. 12B, whereas the positional error could be improved up to approximately 0.3 nm in FIG. 11A and FIG. 11B.

That is to say, in accordance with the present embodiment, the magnetic heads may be followed to the RRO by the tracking type repetitive control unit 5 with respect to the low frequency runout components lower than, or equal to 1 KHz. Also, the magnetic heads may not respond to the repeatable runout vibrations by the rejection type repetitive control unit 6 with respect to the high frequency runout components higher than, equal to 1 KHz. The modified position error signal can be greatly improved based upon these characteristics.

Figure 14:
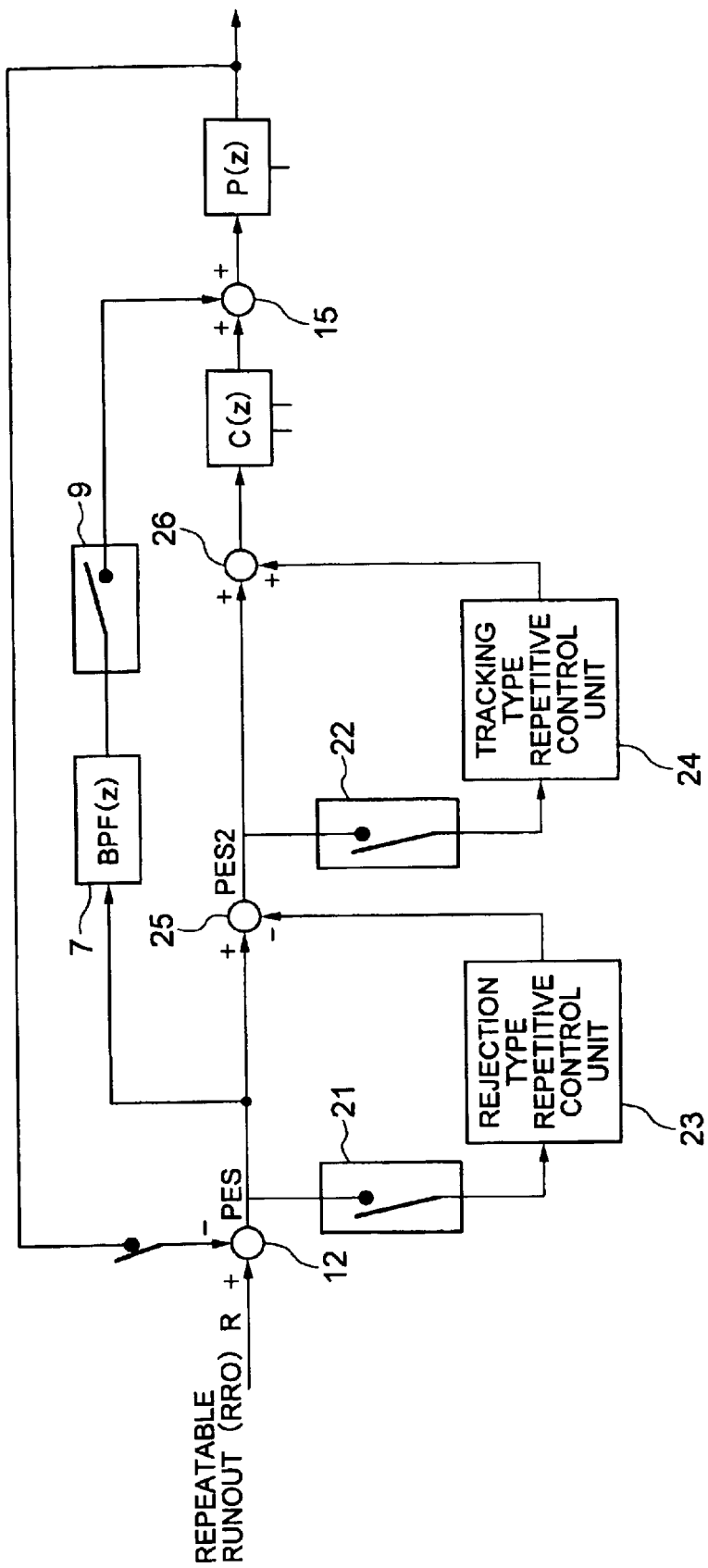
FIG. 14 is a schematic block diagram of a following control system according to a second embodiment mode of the present invention.

FIG. 14 is a schematic block diagram for indicating a following control system of a magnetic disk drive according to a second embodiment mode of the present invention. It should be noted that the same reference numerals shown in the first embodiment mode will be employed as those for denoting the same, or similar structural components of the second embodiment mode.

In the previously explained first embodiment mode, the positioning control (following control) system is arranged by connecting the tracking type repetitive control unit 6 and the rejection type repetitive control unit 5 in the parallel manner. The following control system of this second embodiment mode is arranged by connecting a tracking type repetitive control unit 24 and a rejection type repetitive control unit 23 in a series manner.

In the second embodiment mode, an output from a runout compensator 7 is added to an output from a following filter 11 by an adder 15. Thereafter, a total number of servo sector interrupts is counted by a counter. A switch 21 enters a position error signal PES into the rejection type repetitive control unit 23 in the case that this count value becomes larger than, or equal to a predetermined value.

A subtracter 25 subtracts the position error signal PES from an output signal derived from the rejection type repetitive control unit 23 so as to produce a modified position error signal PES2.

Similar to the switch 21, another switch 22 enters the modified position error signal PES2 into the tracking type repetitive control unit 24 in such a case that the above-explained count value becomes larger than, or equal to the predetermined value.

The rejection type repetitive control unit 23 owns an arrangement similar to that (explained in FIG. 6) of the rejection type repetitive control unit 5 used in the previously explained first embodiment mode. Also, the tracking type repetitive control unit 24 owns an arrangement similar to that (explained in FIG. 4) of the tracking type repetitive control unit 6 used in the previously explained first embodiment mode.

An adder 26 adds the modified position error signal PES2 to an output signal of the tracking type repetitive control unit 24, and then, inputs the added signal to the following filter 11.

As previously explained, even in such a case that the tracking type repetitive control unit 22 is coupled to the rejection type repetitive control unit 23 in the series manner, a similar effect to that of the first embodiment mode can be achieved, so that the modified position error signal PES2 can be improved.

As previously described, both the tracking type repetitive control unit which forces the magnetic heads to follow the low-order harmonics of the RRO components, and the rejection type repetitive control unit which the magnetic head not to respond to the high-order harmonics of the RRO components are provided in the following control loop. As a result, the data destruction occurred in the adjoining tracks can be avoided which is caused by that magnetic heads are unnecessarily followed to the high-order harmonics, and the positioning control of the magnetic head can be carried out in high precision.

Furthermore, such a band-pass filter having a peak at a frequency equal to the disk rotational frequency is combined with both the tracking type repetitive control unit and the rejection type repetitive control unit in the following control system. As a result, after the present control system is switched to the following control system, there is no necessity of such a waiting time equal to one rotation of the magnetic disk, and the control output which should be followed to the deviations can be produced, so that the high-speed positioning control of the magnetic head can be carried out in high precision.

The runout compensator having higher-order (fourth-order runout, fifth-order runout . . . ) band-pass filter can work as the tracking type repetitive control unit. It means that the band-pass filter can be used with the rejection type repetitive control unit instead of the tracking type repetitive control unit. In this case, the band-pass filter doesn't need the tracking type repetitive control unit to carry out the high precision positioning control of the magnetic head without waiting one rotation.

There is a tendency that the low frequency component is bigger than the high-frequency component. So that frequency component of RRO is small, or high-frequency component of RRO can be compensated by feed forward control or something in other way of above embodiment, the frequency component having band-pass filter can be used with the tracking type repetitive control unit instead of the rejection type repetitive control unit. In this case, the band-pass filter doesn't need the rejection type repetitive control unit to carry out the high precision positioning control of the magnetic head without waiting one rotation.

As a consequence, there is no necessity of such a waiting time equal to one rotation of another magnetic disk where a servo pattern has previously been recorded with respect to another problem occurred in such a magnetic disk drive in which the above-described magnetic disk is installed. Namely, a center of a circumference along which the servo pattern has been recorded is not made coincident with a rotation center of this magnetic disk, so that deviations of about a dozen µm are produced. Thus, the positioning control of the magnetic head can be carried out in high precision, to which the deviation compression effect is reflected.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A disk drive comprising:
   a head for reading out information which has been recorded on a disk and/or for writing information to be recorded on said disk;
   an actuator for driving said head;
   a subtracter for detecting a position error signal from both a position of said head and a position of a target track; and
   a controller constituted by both a tracking type repetitive control unit responding to a repeatable runout component of said target track, and a rejection type repetitive control unit which does not respond to said repeatable runout component, for positioning said head to said target track in response to the position error signal detected by said subtracter.

2. A disk drive as claimed in claim 1 wherein:
   said tracking type repetitive control unit and said rejection type repetitive control unit are connected in a parallel manner.

3. A disk drive as claimed in claim 1 wherein:
   said tracking type repetitive control unit and said rejection type repetitive control unit are connected in a series manner.

4. A disk drive as claimed in claim 1 wherein:
   said tracking type repetitive control unit is provided with a low-pass filter.

5. A disk drive as claimed in claim 4 wherein:
   said low-pas filter is a zero phase type FIR (finite impulse response) filter.

6. A disk drive as claimed in claim 1 wherein:
   said rejection type repetitive control unit is provided with a high-pass filter.

7. A disk drive as claimed in claim 6 wherein:
   said high-pass filter is a zero phase type FIR (finite impulse response) filter.

8. A disk drive comprising:
   a head for reading/writing either information which has been recorded on a disk or information to be recorded on said disk;
   an actuator for driving said head;
   a subtracter for detecting a position error signal from both a position of said head and a position of a target track; and
   a controller constituted by at least any one of a tracking type repetitive control unit responding to a repeatable runout component of said target track, and a rejection type repetitive control unit which does not respond to said repeatable runout component, for positioning said head to said target track in response to the position error signal detected by said subtracter, said controller comprising a band-pass filter having a peak at a frequency defined by multiplying a rotation number of said disk by an integer.

9. A disk drive as claimed in claim 8 wherein:
   said band-pass filter corresponds to a band-pass filter having a gain peak at a frequency defined by multiplying said disk rotation number by one time.

10. A disk drive as claimed in claim 8 wherein:
    said band-pass filter corresponds to a band-pass filter having a gain peak at a frequency defined by multiplying said disk rotation number by two times.

11. A disk drive as claimed in claim 8 wherein:
    said band-pass filter corresponds to a band-pass filter having a gain peak at a frequency defined by multiplying said disk rotation number by three times.

12. A disk drive as claimed in claim 8 wherein:
    said band-pass filter is arranged by connecting a band-pass filter having a gain peak at a frequency defined by multiplying said disk rotation number by one time, a band-pass filter having a gain peak at a frequency defined by multiplying said disk rotation number by two times, and also, a band-pass filter having a gain peak at a frequency defined by multiplying said disk rotation number by three times in a parallel manner.

13. A disk drive as claimed in claim 8 wherein:
    said tracking type repetitive control unit is provided with a low-pass filter.

14. A disk drive as claimed in claim 13 wherein:
    said low-pass filter is a zero phase type FIR (finite impulse response) filter.

15. A disk drive as claimed in claim 8 wherein:
    said rejection type repetitive control unit is provided with a high-pass filter.

16. A disk drive as claimed in claim 15 wherein:
    said high-pass filter is a zero phase type FIR (finite impulse response) filter.

17. A disk drive as claimed in claim 8, wherein said controller is constituted by both of said tracking type repetitive control unit and said rejection type repetitive control unit.

18. A disk drive comprising:
    a head for reading out information which has been recorded on a disk and/or for writing information to be recorded on said disk;
    an actuator for driving said head;
    a subtracter for detecting a position error signal from both a position of said head and a position of a target track; and
    a controller having both a peak characteristic and a notch characteristic in a gain characteristic of an open loop at a frequency defined by multiplying a disk rotation number by an integer while an open loop characteristic of a following control system is measured, for positioning said head to the target track in response to the position error signal detected by said subtracter.

19. A disk drive as claimed in claim 18 wherein:
    a peak frequency of said gain characteristic which is measured while the open loop characteristic of the following control system is measured is lower than a notch frequency.

* * * * *